United States Patent Office 3,486,979
Patented Dec. 30, 1969

1

3,486,979
METHOD OF PREVENTING PLUTONIUM LEAKAGE
Cornel Wohlberg, Los Alamos, N. Mex., assignor to the United States of America as represented by the United States Atomic Energy Commission
No Drawing. Filed Oct. 11, 1966, Ser. No. 586,604
Int. Cl. G21c 3/00; B23k 29/00
U.S. Cl. 176—67                                              1 Claim

ABSTRACT OF THE DISCLOSURE

A tantalum container for plutonium fuels rendered resistant to leakage of the plutonium fuel by incorporation of zirconium carbides into the grain boundaries of the tantalum. The container is made by adding carbon to the tantalum in an amount of about 120 p.p.m. arc melting the tantalum and zirconium carbide (source of carbon), and melting the resulting mixture repeatedly.

---

The invention described herein was made in the course of, or under, a contract with the U.S. Atomic Energy Commission.

This invention relates to a method and means of preventing the leakage of plutonium from containers and, more particularly, the leakage of molten plutonium from tantalum in heat affected zones.

It is generally found in tantalum tubes or capsules used to contain fast reactor fuels of the type of plutonium-cobalt-cerium liquid alloy (alloys used at liquid condition in excess of 500° C.) that leakage of fuel occurs above the liquid level through grain boundaries in the tantalum tubes. In particular, it has been found that the greatest amount of leakage occurs not so much below the level of the liquid fuel but in the gas phase in the so-called heat affected zones near the welds which are used to cap the tube.

It has been found in the past that carbon can be incorporated into the tantalum and heat treated at some temperature such as 1650° C. in a vacuum so that carbide in excess of the solubility limit migrates to the grain boundaries, segregates there and penetration of the liquid metal is either prevented or minimized. The difficulty usually occurs when these carbon-containing tantalum alloys containing somewhat in excess of 50 or more p.p.m. of carbon are welded. Since tantalum has such a very large solvent power for interstitial elements like carbon, whenever a weld is made it is found that the effect of the segregation has disappeared, that the carbide seems to vanish from the grain boundaries at and near the weld. The net result is usually that the material becomes susceptible to penetration again by the liquid metal.

The purpose of the invention therefore is to provide a means of incorporating carbide into the grain boundaries in such a way that even the as-cast structure contains

2 carbide segregated into grain boundaries. In a preferred embodiment of this invention this is effected by incorporating, into the metal, carbon in the form of zirconium-carbide which is arc melted into the tantalum by known and standard means. It has been found that carbon can be incorporated in as low a concentration as 120 p.p.m. and still find carbide segregated into grain boundaries after repeated arc-melting of the alloyed buttons. Specifically, for instance, if about 2070 p.p.m. zirconium carbide are incorporated representing 240 p.p.m. of carbon after arc-melting 120 p.p.m. of carbon and about 900 p.p.m. of zirconium will usually be retained.

In another example 4130 p.p.m. of zirconium carbide equivalent to 480 p.p.m. of carbide were added to the tantalum. After arc-melting four times the material is found to contain 320 p.p.m. of carbon and 2000 p.p.m. of zirconium. After rolling and on annealing at 1800° C. for one hour in a vacuum they still show the segregated structure which is desired. The method of adding zirconium carbide is as a powder (usually wrapped in tantalum foil) to scraps or chunks of tantalum ⅛ to ¼ in. diameter. These are then rapidly melted in an inert gas arc, the atmosphere being one-fifth argon and four-fifths helium, and rapidly turning the button and remelting to get homogenization. Although the invention should not be restricted thereby, it is believed that the low solubility of zirconium in the tantalum metal accounts for segregation, probably as zirconium carbide, in the grain boundaries, as contrasted to the usual methods. The invention thereby minimizes migration of plutonium out of molten plutonium-cobalt-cerium alloy or iron-plutonium eutectic alloy through the grain boundaries of tantalum.

In this method four remelts were used as a standard condition. However, electron beam melting of previously arc-melted material can also be used and indeed has been used without too great a loss of material to the vacuum.

What is claimed is:

1. A tantalum tube or capsule containing plutonium fuel having at least one welded zone therein which is rendered resistant to plutonium leakage in the heat affected zone of the weld by the presence of zirconium carbide segregated into the grain boundaries of said zone.

References Cited

UNITED STATES PATENTS

| | | | |
|---|---|---|---|
| 896,705 | 8/1908 | Von Bolton | 75—174 X |
| 3,141,235 | 7/1964 | Lenz | 75—174 X |
| 3,265,540 | 8/1966 | Foley | 75—174 X |

FOREIGN PATENTS

| | | |
|---|---|---|
| 1,013,248 | 12/1965 | Great Britain. |

CHARLES N. LOVELL, Primary Examiner

U.S. Cl. X.R.

29—198; 75—174; 176—91